US012771392B2

(12) United States Patent
Yu et al.

(10) Patent No.: US 12,771,392 B2
(45) Date of Patent: Oct. 20, 2026

(54) RADIO-FREQUENCY FRONT-END CIRCUIT FOR LOCATION SERVICES AND WIRELESS COMMUNICATION

(71) Applicant: Google LLC, Mountain View, CA (US)

(72) Inventors: Yingqun Yu, San Diego, CA (US); Ming Sun, Mountain View, CA (US); Jing Liang, Saratoga, CA (US); Insoo Hwang, Sammamish, WA (US); Han Kim, Seoul (KR)

(73) Assignee: Google LLC, Mountain View, CA (US)

( * ) Notice: Subject to any disclaimer, the term of this patent is extended or adjusted under 35 U.S.C. 154(b) by 222 days.

(21) Appl. No.: 18/777,245

(22) Filed: Jul. 18, 2024

(65) Prior Publication Data

US 2024/0380425 A1 Nov. 14, 2024

Related U.S. Application Data

(60) Provisional application No. 63/670,404, filed on Jul. 12, 2024.

(51) Int. Cl.
*H04B 1/16* (2006.01)
*G01S 19/36* (2010.01)
*G01S 19/37* (2010.01)

(52) U.S. Cl.
CPC ................ *H04B 1/16* (2013.01); *G01S 19/36* (2013.01); *G01S 19/37* (2013.01)

(58) Field of Classification Search
None
See application file for complete search history.

(56) References Cited

U.S. PATENT DOCUMENTS

2002/0193108 A1 12/2002 Robinett
2012/0202561 A1* 8/2012 Robinett ................ H04B 1/006 455/552.1
2017/0155445 A1 6/2017 Xie et al.
2019/0334572 A1 10/2019 Lin et al.
2024/0012139 A1* 1/2024 Gulati ................... G01S 13/426
2025/0211179 A1* 6/2025 Kaukovuori .............. H03F 3/72

FOREIGN PATENT DOCUMENTS

WO 2016193897 A1 12/2016

* cited by examiner

*Primary Examiner* — Alison Slater
(74) *Attorney, Agent, or Firm* — Colby Nipper PLLC

(57) ABSTRACT

Techniques and apparatuses are described that implement a radio-frequency front-end (RFFE) circuit for location services and wireless communication. In an example aspect, a computing device includes a radio-frequency front-end circuit, which is used to provide location services via a global navigation satellite system and wireless communication via a non-terrestrial network. In one aspect, an architecture of the radio-frequency front-end circuit supports the concurrent reception of signals for location services and wireless communication. This allows location information to be updated for proper timing adjustment during a downlink time interval. At least some components of the radio-frequency front-end circuit have a shared-use and operate on signals that are received for location services as well as signals that are received for wireless communication. In another aspect, the radio-frequency front-end circuit uses a switching circuit to provide a relatively simple and inexpensive means of coexistence management.

10 Claims, 5 Drawing Sheets

RADIO-FREQUENCY FRONT-END CIRCUIT FOR LOCATION SERVICES AND WIRELESS COMMUNICATION

CROSS-REFERENCE TO RELATED APPLICATION(S)

This application claims the benefit of U.S. Provisional Patent Application Ser. No. 63/670,404, filed on Jul. 12, 2024, the disclosure of which is incorporated by reference herein it its entirety.

SUMMARY

Techniques and apparatuses are described that implement a radio-frequency front-end (RFFE) circuit for location services and wireless communication. In an example aspect, a computing device includes a radio-frequency front-end circuit, which is used to provide location services via a global navigation satellite system and wireless communication via a non-terrestrial network. In one aspect, an architecture of the radio-frequency front-end circuit supports the concurrent reception of signals for location services and wireless communication. This allows location information to be updated for proper timing adjustment during a downlink time interval. At least some components of the radio-frequency front-end circuit have a shared-use and operate on signals that are received for location services as well as signals that are received for wireless communication. One such component is an amplification circuit. A gain of the amplification circuit can be set so as to compensate for an insertion loss of another component within the radio-frequency front-end circuit. By reusing or sharing components for both location services and for wireless communication, a footprint and cost of the radio-frequency front-end circuit can be smaller compared to implementing two dedicated front-end circuits. In another aspect, the radio-frequency front-end circuit uses a switching circuit to provide a relatively simple and inexpensive means of coexistence management. With the switching circuit, the radio-frequency front-end circuit can prevent a transmission for wireless communication from interfering with the reception for location services.

Aspects described below include an apparatus with a radio-frequency front-end circuit. The radio-frequency front-end circuit is configured to be coupled to an antenna, a first receiver, and a second receiver. The radio-frequency front-end circuit is also configured to accept, from the antenna, a global-navigation-satellite-system signal transmitted by a global navigation satellite system and a downlink signal transmitted by a non-terrestrial network. Additionally, the radio-frequency front-end circuit is configured to amplify, using an amplification circuit of the radio-frequency front-end circuit, the global-navigation-satellite-system signal and the non-terrestrial downlink signal. The radio-frequency front-end circuit is further configured to pass at least the amplified global-navigation-satellite-system signal to the first receiver. Also, the radio-frequency front-end circuit is configured to pass at least the amplified downlink signal to the second receiver.

Aspects described below include a method of operating a radio-frequency front-end circuit for location services and wireless communication.

Aspects described below include a computer-readable storage media comprising computer-executable instructions that, responsive to execution by a processor, implement a controller configured to control a state of a radio-frequency front-end circuit.

BRIEF DESCRIPTION OF DRAWINGS

Apparatuses for and techniques for implementing and operating a radio-frequency front-end circuit for location services and wireless communication are described with reference to the following drawings. The same numbers are used throughout the drawings to reference like features and components.

DETAILED DESCRIPTION

Modern computing devices often include multiple systems that provide a variety of different functionalities. One such system includes a global navigation satellite system (GNSS), which provides location services. Another system can provide wireless communication utilizing a non-terrestrial network (NTN). In some situations, these systems utilize similar frequency bands, which can lead to interference and make it challenging for at least one of the systems to operate. As new technologies are developed, integrating these new technologies into ever-smaller devices may become increasingly difficult.

To address this challenge, techniques and apparatuses are described that implement a radio-frequency front-end circuit for location services and wireless communication. In one aspect, an architecture of the radio-frequency front-end circuit supports the concurrent reception of signals for location services and wireless communication. This allows location information to be updated for proper timing adjustment during a downlink time interval. An architecture of the radio-frequency front-end circuit supports the concurrent reception as well as the non-concurrent reception of signals for location services and wireless communication. In this way, the radio-frequency front-end circuit can be more responsive in providing location services and receiving non-terrestrial communications compared to other devices that are unable to support concurrent reception.

At least some components of the radio-frequency front-end circuit have a shared-use and operate on signals that are received for location services as well as signals that are received for wireless communication. One such component is an amplification circuit. A gain of the amplification circuit can be set so as to compensate for an insertion loss of another component within the radio-frequency front-end circuit. By reusing or sharing components for both location services and for wireless communication, a footprint and cost of the radio-frequency front-end circuit can be smaller compared to implementing two separate front-end circuits.

The radio-frequency front-end circuit can also provide a relatively simple and inexpensive means of coexistence management using a switching circuit. With the switching circuit, the radio-frequency front-end circuit can prevent a transmission for wireless communication from interfering with the reception for location services. The switching circuit enables the computing device to avoid additional software complexity and/or additional hardware associated with other coexistence management techniques, such as power-amplifier (PA) blanking.

Operating Environment

Figure 1:
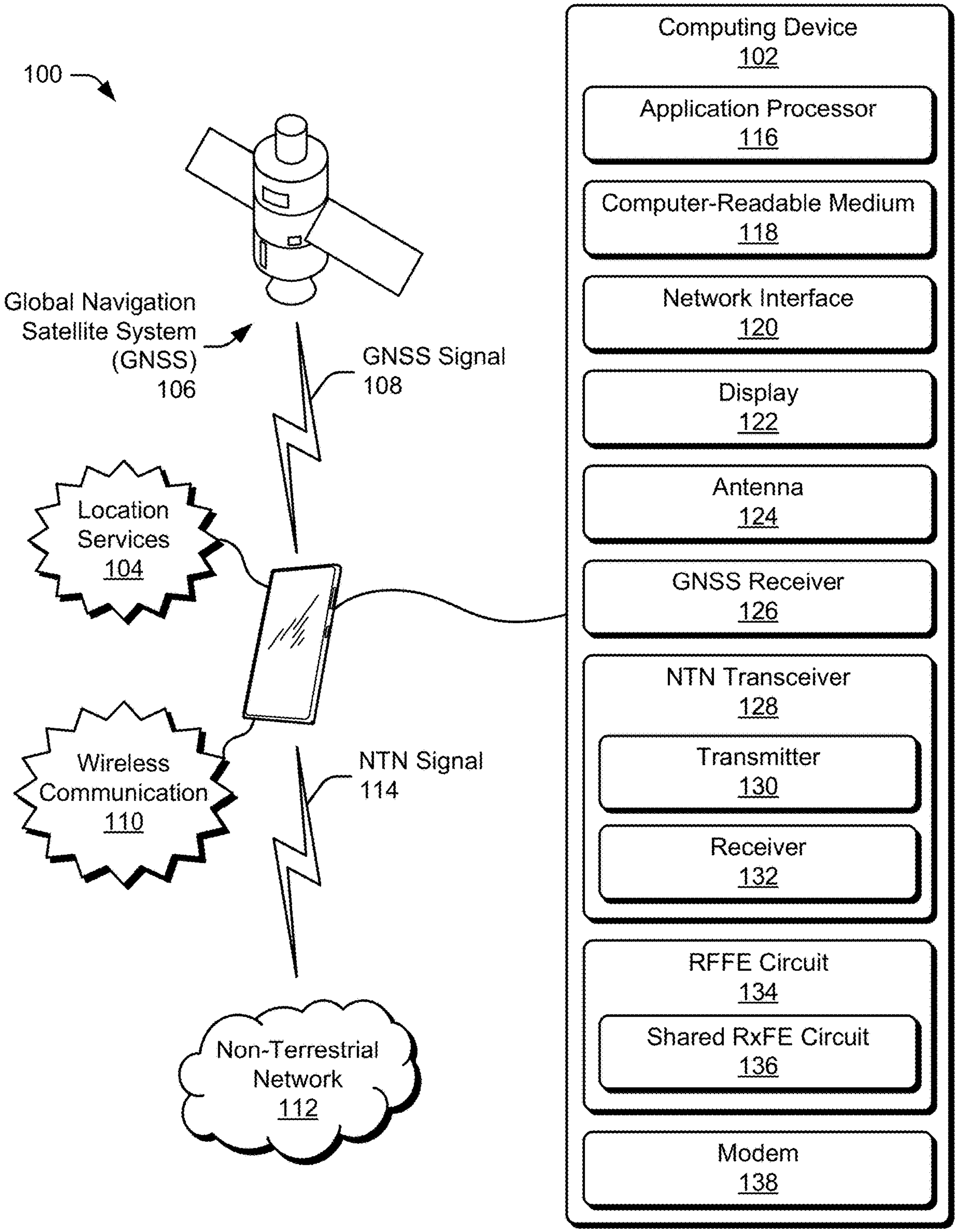
FIG. 1 illustrates an example environment in which aspects of a radio-frequency front-end circuit for location services and wireless communication can be implemented.

FIG. 1 is an illustration of an example environment 100 in which a radio-frequency front-end circuit for location services and wireless communication can be implemented. In the example environment 100, a computing device 102 provides location services 104. With location services 104, the computing device 102 can determine its location based on information provided by a global navigation satellite system 106. More specifically, the computing device 102 receives a global-navigation-satellite-system signal 108 from the global navigation satellite system 106 and determines its location based on the global-navigation-satellite-system signal 108.

The computing device 102 also performs wireless communication 110 utilizing a non-terrestrial network (NTN) 112. The wireless communication 110 can also be referred to as non-terrestrial wireless communication and/or non-terrestrial-network-based wireless communications. The non-terrestrial network 112 can be implemented using at least one of the following: a communication satellite, an airplane, an unmanned aerial system (e.g., a drone or an unmanned aerial vehicle), a hot air balloon, or some combination thereof. With the non-terrestrial network 112, the computing device 102 can communicate wirelessly with another entity using a non-terrestrial-network signal 114 (NTN signal 114). The non-terrestrial-network signal 114 can represent an uplink signal transmitted by the computing device 102 and/or a downlink signal received by the computing device 102. In example implementations, the transmission and reception for the wireless communications 110 are at least time-division duplexed (TDD). This means that transmission and reception occur at different, non-overlapping time intervals. The transmission and reception for the wireless communications 110 can optionally be frequency-division duplexed (FDD). This means that transmission and reception occur at different frequency bands.

During some situations, the computing device 102 provides location services 104 using the global navigation satellite system 106 while performing wireless communication 110 using the non-terrestrial network 112. Consider an example in which a user is driving. The user activates a global-navigation-satellite-system-based application on the computing device 102 to navigate to a destination. While driving towards the destination, the user also uses the computing device 102 to stream audio content using the non-terrestrial network 112. By performing location services 104 concurrently with wireless communications 110, communications with the non-terrestrial network 112 can be readily maintained while the user is on the move. The location services 104, for instance, can provide updated location information for proper timing adjustments during a downlink time interval associated with the wireless communication 110. These timing adjustments can enable the computing device 102 to maintain communication with the non-terrestrial network 112.

In some situations, concurrent transmissions for wireless communications 110 can generate interference for location services 104. This can occur if the transmission frequency band for wireless communication overlaps with or is sufficiently close to the reception frequency band for location services 104. Other situations are also possible in which a harmonic frequency and/or an intermodulation product (e.g., a second-order intermodulation product, a third-order intermodulation product, a fifth-order intermodulation product) associated with transmission frequency band for wireless communication 110 overlaps with or is sufficiently close to the reception frequency band for location services 104. An example situation that can cause interference is further described with respect to FIG. 2.

Figure 2:
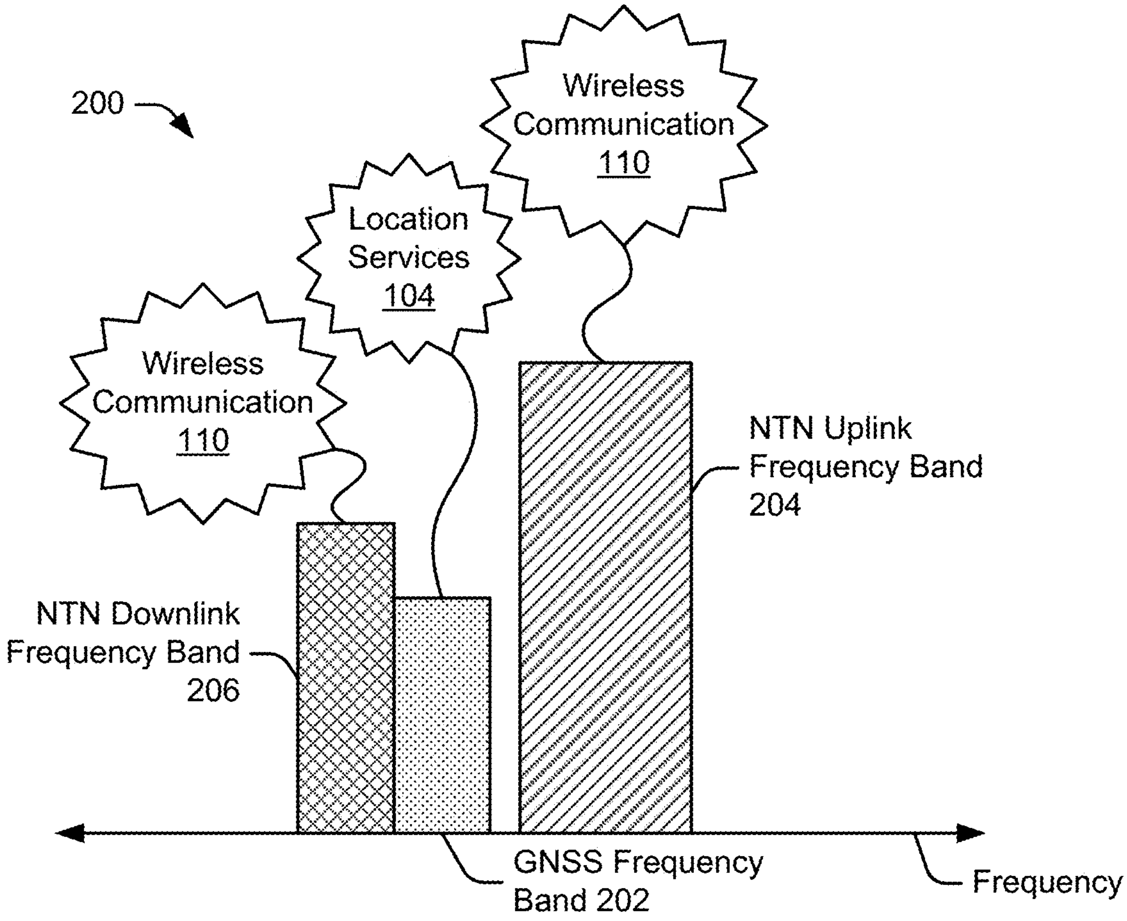
FIG. 2 illustrates example frequency bands associated with location services and wireless communication via a non-terrestrial network.

FIG. 2 illustrates example frequency bands associated with location services 104 and wireless communication 110 using the non-terrestrial network 112. Consider an example in which the location services 104 utilize a global-navigation-satellite-system frequency band 202 (GNSS frequency band 202) for reception. Additionally, the wireless communications 110 via the non-terrestrial network 112 utilizes a non-terrestrial-network uplink frequency band 204 (NTN uplink frequency band 204) for transmissions. Each frequency band 202 and 204 can represent one of multiple frequency bands that are available to perform the corresponding service.

A graph 200 depicts examples of the global-navigation-satellite-system frequency band 202 and the non-terrestrial-network uplink frequency band 204. In this example, the frequency bands 202 and 204 include different frequencies (e.g., the frequency bands 202 and 204 are distinct and do not overlap). Consider an example in which the frequency band 202 represents a Global Positioning System (GPS) L1 band, which includes frequencies between approximately 1559 and 1607 megahertz (MHz). The frequency band 204 represents uplink frequency band n255, which includes frequencies between approximately 1626.5 and 1660.5 MHz. In this example, a gap (or separation) between the frequency bands 202 and 204 is as small as 19.5 MHz. This gap may be insufficient from preventing a transmission within the non-terrestrial-network uplink frequency band 204 from leaking into and interfering with the global-navigation-satellite-system frequency band 202. This interference can make it challenging to detect the weaker global-navigation-satellite-system signal 108. As such, it is desirable to prevent concurrent transmission for wireless communication 110 and reception for location services 104.

The graph 200 also depicts a non-terrestrial-network downlink frequency band 206 (NTN downlink frequency band 206), which can be used for receiving wireless communications 110 via the non-terrestrial network 112. Consider an example in which the frequency band 206 represents downlink frequency band n255, which includes frequencies between approximately 1525 and 1559 MHz. As seen in the graph 200, the frequency bands 202 and 206 are close in frequency. In general, the frequency bands 202 and 206 are sufficiently close such that a radio-frequency front-end circuit can use a same component (e.g., a same amplifier) to process both signals, as further described below.

Returning to FIG. 1, the computing device 102 can be implemented using various non-limiting example devices including a desktop computer, a tablet, a laptop, a television, a computing watch, computing glasses, a home-automation system, an appliance (e.g., a microwave or a refrigerator), and a vehicle. Other devices may also be used, such as a gaming system, a home service device, a smart speaker, a smart thermostat, a baby monitor, a Wi-Fi® router, a drone, a trackpad, a drawing pad, a netbook, an e-reader, a wall display, and another home appliance. Note that the computing device 102 can be wearable, non-wearable but mobile, or relatively immobile (e.g., desktops and appliances).

The computing device 102 includes at least one application processor 116 and at least one computer-readable medium 118, which includes memory media and storage media. Applications and/or an operating system (not shown) embodied as computer-readable instructions on the computer-readable medium 118 can be executed by the application processor 116 to provide some of the functionalities described herein.

The computing device 102 can also include a network interface 120 for communicating data over wired, wireless, or optical networks. For example, the network interface 120 may communicate data over at least the non-terrestrial network 112. Optionally, the network interface 120 may communicate other data over a local-area-network (LAN), a wireless local-area-network (WLAN), a personal-area-network (PAN), a wire-area-network (WAN), an intranet, the Internet, a peer-to-peer network, point-to-point network, a mesh network, Bluetooth®, and the like. The computing device 102 may also include a display 122.

The computing device 102 also includes at least one antenna 124. In some implementations of the antenna 124, the computing device 102 includes multiple antenna elements, which form an antenna array. The antenna 124 is at least utilized for location services 104 via the global navigation satellite system 106 and for wireless communication 110 via the non-terrestrial network 112. For some implementations, it is possible that the antenna 124 supports other functions or features of the computing device 102 involving radio-frequency signals (e.g., radar or other types of wireless communication).

To provide location services 104, the computing device 102 includes at least one global-navigation-satellite-system receiver 126 (GNSS receiver 126). The global-navigation-satellite-system receiver 126 communicates with the global navigation satellite system 106 to perform aspects of geopositioning. The global-navigation-satellite-system receiver 126 can be designed to support any type of satellite navigation system, including the United States' Global Positioning System (GPS), Russia's Global Navigation Satellite System (GLONASS), China's BeiDou Navigation Satellite System (BDS), the European Union's Galileo, and so forth.

The global-navigation-satellite-system receiver 126 can be a single-band receiver or a multi-band receiver. An example single-band receiver operates using the GPS L1 band. An example multi-band receiver operates using the GPS L2 and L5 bands. The global-navigation-satellite-system receiver 126 can be implemented on one or more integrated circuits. During operation, the global-navigation-satellite-system receiver 126 receives and processes the global-navigation-satellite-system signal 108.

Although not explicitly shown, the computing device 102 can also include at least one global-navigation-satellite-system manager, which controls an operation of the global-navigation-satellite-system receiver 126. The global-navigation-satellite-system manager can be implemented using hardware, software, firmware, fixed-logic circuitry, or some combination thereof. In some implementations, the global-navigation-satellite-system manager is implemented by the application processor 116. The global-navigation-satellite-system manager can configure the global-navigation-satellite-system receiver 126 and determine the location of the computing device 102 based on the information provided by the global-navigation-satellite-system receiver 126.

To provide wireless communication 110 via the non-terrestrial network 112, the computing device 102 includes at least one non-terrestrial-network transceiver 128 (NTN transceiver 128). In an example implementation, the non-terrestrial-network transceiver 128 includes at least one transmitter 130 and at least one receiver 132. The transmitter 130 and/or the receiver 132 can be implemented on one or more integrated circuits. Components of the transmitter 130 and/or the receiver 132 can include amplifiers, switches, mixers, analog-to-digital converters, digital-to-analog converters, filters, and so forth for conditioning signals (e.g., for generating or processing signals).

The non-terrestrial-network transceiver 128 is at least a half-duplex system. This means that, during operation, the transmitter 130 and the receiver 132 operate at different times. For example, the transmitter 130 transmits an uplink signal to the non-terrestrial network 112 during a first time interval. During a second time interval, the receiver 132 receives a downlink signal from the non-terrestrial network 112. In some implementations, the non-terrestrial-network transceiver 128 is a half-duplex frequency-division-duplex (HD-FDD) system. This means that, during operation, the transmitter 130 and the receiver 132 operate at different times and also operate on signals associated with different frequency bands.

The computing device 102 includes a radio-frequency front-end circuit 134, which supports both location services 104 and wireless communication 110. The radio-frequency front-end circuit 134 includes shared-use components that operate on signals that are received for location services 104 and/or wireless communication 110. These components are part of a shared receiver front-end circuit 136 (shared RxFE circuit 136). The shared receiver front-end circuit 136 enables concurrent (and non-concurrent) reception for location services 104 and wireless communication 110. The radio-frequency front-end circuit 134 also provides coexistence management by preventing a transmission for wireless communication 110 from interfering with reception for location services 104, as further explained with respect to FIG. 3.

The computing device 102 can optionally include a modem 138 (or a controller). The modem 138 can be implemented using hardware, software, firmware, fixed-logic circuitry, or a combination thereof. In some implementations, the modem 138 is implemented as part of the application processor 116. The modem 138 controls a state (or a configuration or an operation) of the radio-frequency front-end circuit 134.

In FIG. 1, the global-navigation-satellite-system receiver 126 and the non-terrestrial-network transceiver 128 are implemented within the computing device 102. Other implementations are also possible in which the global-navigation-satellite-system receiver 126 and the non-terrestrial-network transceiver 128 are separate, collocated entities. Aspects of the radio-frequency front-end circuit 134 are further described with respect to FIG. 3.

Figure 3:
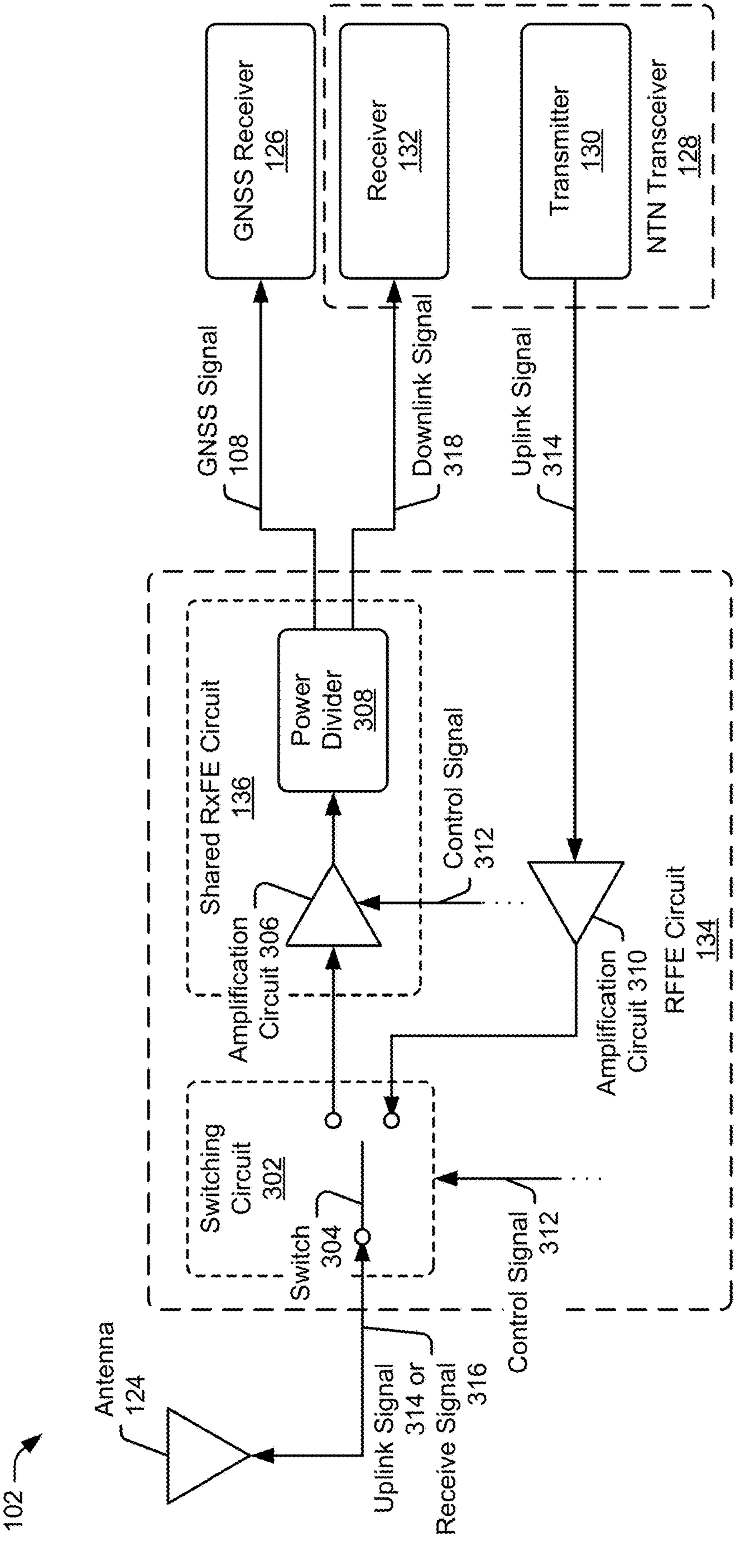
FIG. 3 illustrates example components of a computing device including a radio-frequency front-end circuit for location services and wireless communication.

Radio-Frequency Front-End Circuit for Location Services and Wireless Communication FIG. 3 illustrates an example implementation of the radio-frequency front-end circuit 134 and its relationship to other components within the computing device 102. In the depicted configuration, the computing device 102 includes the antenna 124, the global-navigation-satellite-system receiver 126, the non-terrestrial-network transceiver 128, and the radio-frequency front-end circuit 134. The radio-frequency front-end circuit 134 is coupled between the antenna 124 and the global-navigation-satellite-system receiver 126. Also, the radio-frequency front-end circuit 134 is coupled between the antenna 124 and the non-terrestrial-network transceiver 128.

The radio-frequency front-end circuit 134 includes the shared receiver front-end circuit 136 and at least one switching circuit 302. The switching circuit 302 provides coexistence management by selectively coupling the transmitter 130 of the non-terrestrial-network transceiver 128 or the shared receiver front-end circuit 136 to the antenna 124. In this way, the switching circuit 302 prevents a transmission for wireless communication 110 from interfering with the reception for location services 104.

The switching circuit 302 includes at least one switch 304. In example implementations, the switch 304 represents a single-pole double-throw (SPDT) switch. In this case, the pole is coupled to the antenna 124. A first throw of the switch 304 is coupled to the shared receiver front-end circuit 136. A second throw of the switch 304 is coupled to the transmitter 130 of the non-terrestrial-network transceiver 128. Using the switching circuit 302, the radio-frequency front-end circuit 134 selectively couples the antenna 124 to a transmit path or a receive path of the radio-frequency front-end circuit 134. By mitigating interference using the switching circuit 302, the computing device 102 can be implemented in a manner that avoids the additional cost and/or complexity associated with other software-based and/or hardware-based coexistence management techniques, such as power-amplifier blanking.

The shared receiver front-end circuit 136 includes at least one amplification circuit 306 and at least one power divider 308 (or a power splitter). The amplification circuit 306 includes at least one amplifier, such as a low-noise amplifier (LNA). During operation, the amplification circuit 306 provides amplification for location services 104 and/or wireless communication 110. The amplification circuit 306 is designed to have a gain that compensates for at least an insertion loss associated with the power divider 308. For example, the amplification circuit 306 can be designed to have an additional three decibels (dB) of gain to compensate for the approximately three decibels of insertion loss associated with the power divider 308. The amplification circuit 306 can be appropriately configured to support both location services 104 and wireless communication 110 as the strength (e.g., power level) of the signals that are received for location services 104 and for wireless communication 110 via the non-terrestrial network 112 are within a similar range. In an example implementation, the amplification circuit 306 is implemented using a single-stage common-gain amplifier, which can meet the performance requirements for both the global-navigation-satellite-system receiver 126 and the receiver 132. By reusing or sharing the amplification circuit 306 for both location services 104 and for wireless communication 110, a footprint and cost of the radio-frequency front-end circuit 134 can be smaller compared to another radio-frequency front-end circuit that has separate receive paths for location services 104 and for wireless communication 110.

The power divider 308 splits an incoming signal into two copies and respectively provides these copies to the global-navigation-satellite-system receiver 126 and the receiver 132 of the non-terrestrial-network transceiver 128. The output signals generated by the power divider 308 each have approximately half an amount of power as the input signal.

Optionally, the radio-frequency front-end circuit 134 can include at least one other amplification circuit 310, which amplifies signals for transmission. The amplification circuit 310 can include at least one amplifier (e.g., a power amplifier (PA)).

A state (or a configuration) of the radio-frequency front-end circuit 134 (and its components) can be controlled by the modem 138 (not shown). During operation, the modem 138 generates a control signal 312 to appropriately configure the radio-frequency front-end circuit 134 for transmission or reception. The transmission is associated with the wireless communication 110 while the reception can be associated with the wireless communication 110 and/or the location services 104. In this example, the control signal 312 controls a state of the switch 304 and a state of the amplification circuit 306. An operation of the modem 138 is further described with respect to FIG. 4. Although not explicitly shown in FIG. 3, the control signal 312 can also control a state of the amplification circuit 310.

For transmission, the transmitter 130 of the non-terrestrial-network transceiver 128 generates an uplink signal 314. The radio-frequency front-end circuit 134 accepts the uplink signal 314 and amplifies the uplink signal 314 using the amplification circuit 310. In accordance with the control signal 312, the switching circuit 302 passes the uplink signal 314 from the amplification circuit 310 to the antenna 124. The antenna 124 transmits the uplink signal 314 to the non-terrestrial network 112. In this case, the uplink signal 314 represents the non-terrestrial-network signal 114 of FIG. 1.

To perform reception for location services 104 and/or for wireless communication 110, the antenna 124 receives a receive signal 316. The receive signal 316 can represent the global-navigation-satellite-system signal 108 associated with location services 104, a downlink signal 318 associated with wireless communication 110 (e.g., the non-terrestrial-network signal 114 of FIG. 1), or both the global-navigation-satellite-system signal 108 and the downlink signal 318. In accordance with the control signal 312, the switching circuit 302 passes the receive signal 316 to the shared receiver front-end circuit 136. The amplification circuit 306 amplifies the receive signal 316. The power divider 308 provides a first version of the receive signal 316 to the global-navigation-satellite-system receiver 126 and a second version of the receive signal 316 to the receiver 132. While providing location services 104, the first version of the receive signal 316 at least includes the global-navigation-satellite-system signal 108. While providing wireless communication 110, the second version of the receive signal 316 at least includes the downlink signal 318. If location services 104 and wireless communication 110 are performed concurrently (e.g., if the receive signal 316 includes the global-navigation-satellite-system signal 108 and the downlink signal 318), the versions of the receive signal 316 that are provided to the global-navigation-satellite-system receiver 126 and the receiver 132 include the global-navigation-satellite-system signal 108 and the downlink signal 318. The global-navigation-satellite-system receiver 126 and the receiver 132 can each employ one or more filters to attenuate the undesired portion of the receive signal 316 and pass the desired portion of the receive signal 316. An operation for controlling the radio-frequency front-end circuit 134 is further described with respect to FIG. 4.

Figure 4:
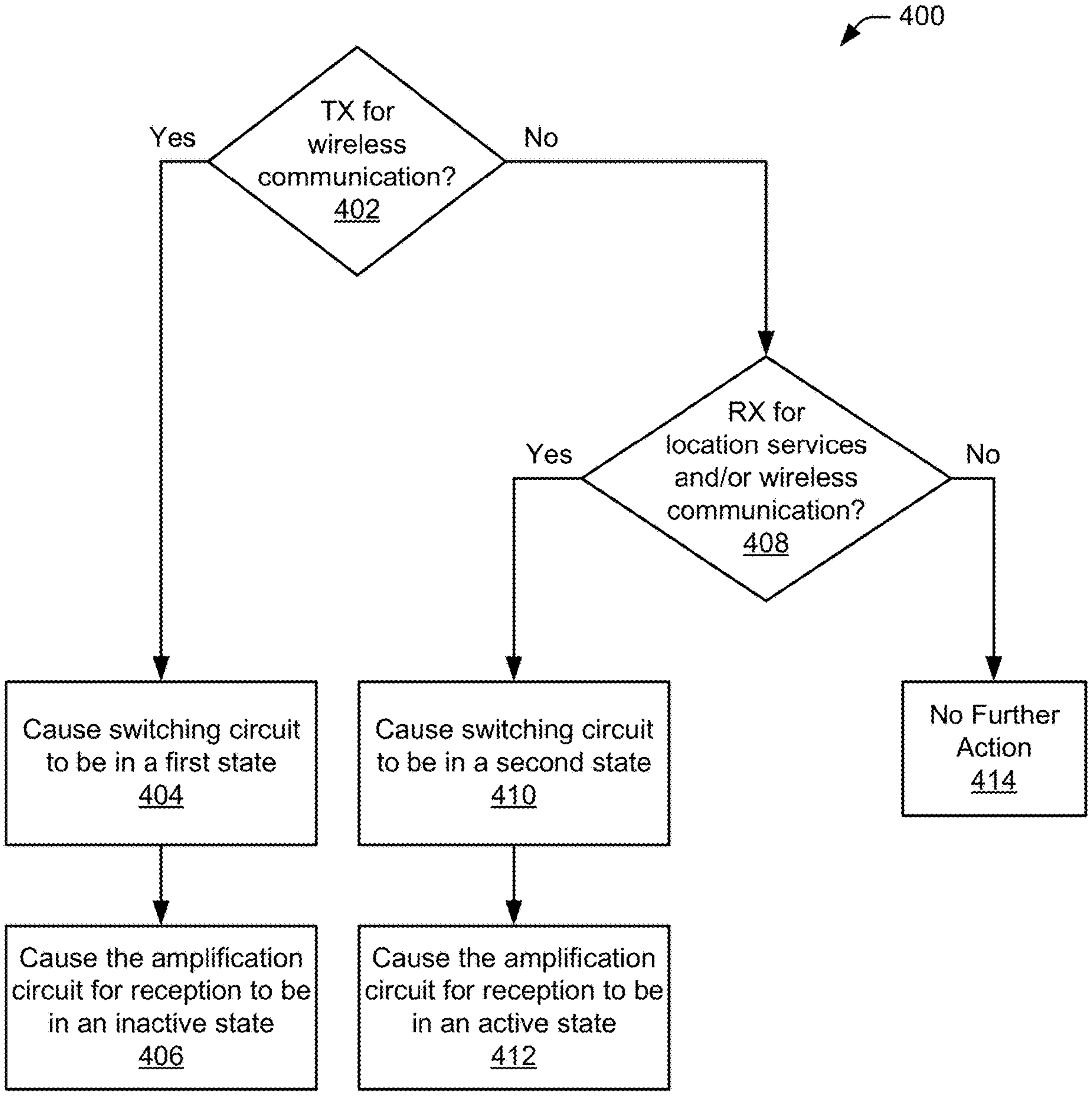
FIG. 4 illustrates example controls for operating a radio-frequency front-end circuit for location services and wireless communication.

FIG. 4 illustrates an example flow diagram 400 for controlling the radio-frequency front-end circuit 134 for location services 104 and wireless communication 110. The operations shown in the flow diagram 400 can be performed by the modem 138. At 402, the modem 138 determines if a transmission for wireless communication 110 is to be performed. If yes, the process proceeds to 404. Otherwise, the process proceeds to 408.

At 404 and 406, the modem 138 appropriately configures the radio-frequency front-end circuit 134 for transmission. At 404, for instance, the modem 138 causes the switching circuit 302 to be in a first state. For example, the modem 138 can generate the control signal 312 to cause the switching circuit 302 to couple (or connect) the transmitter 130 of the non-terrestrial-network transceiver 128 to the antenna 124. Additionally, the control signal 312 causes the switching circuit 302 to decouple (or disconnect) the shared receiver front-end circuit 136 from the antenna 124.

At 406, the modem 138 also causes the amplification circuit 306 for reception to be in an inactive state. For example, the modem 138 can generate the control signal 312 to cause the amplification circuit 306 to be in the inactive state. In addition to protecting the amplification circuit 306 from the transmission, the inactive state can reduce power consumption of the computing device 102.

At 408, the modem 138 determines if reception for location services 104 and/or wireless communication 110 is to be performed. If yes, the process proceeds to 410. Otherwise, the process continues to 414. At 414, the modem 138 does not take any further action.

At 410 and 412, the modem 138 appropriately configures the radio-frequency front-end circuit 134 for reception. At 410, for instance, the modem 138 causes the switching circuit 302 to be in a second state. For example, the modem 138 generates the control signal 312 to cause the switching circuit 302 to connect the shared receiver front-end circuit 136 to the antenna 124. Additionally, the control signal 312 causes the switching circuit 302 to decouple the transmitter 130 of the non-terrestrial-network transceiver 128 from the antenna 124.

At 412, the modem 138 also causes the amplification circuit 306 for reception to be in an active state. For example, the modem 138 can generate the control signal 312 to cause the amplification circuit 306 to be in the active state. In general, the active state of the amplification circuit 306 consumes significantly more power than the inactive state.

In a first example implementation, the control signal 312 generated by the modem 138 includes one bit for controlling both the state of the switch 304 and the state of the amplification circuit 306. This single-bit solution can simplify software control and reduce the cost associated with additional control pins and/or signal routing. Other multi-bit solutions are also possible to provide additional control flexibility and/or power-saving opportunities. For example, in an second example implementation, the control signal 312 includes a first bit dedicated to controlling a state of the switch 304 and a second bit dedicated to controlling a state of the amplification circuit 306. By having a separate bit for controlling the state of the amplification circuit 306, the modem 138 can cause the amplification circuit 306 to be in the inactive state to conserve power even if the computing device 102 is not transmitting for wireless communication 110

Example Method

Figure 5:
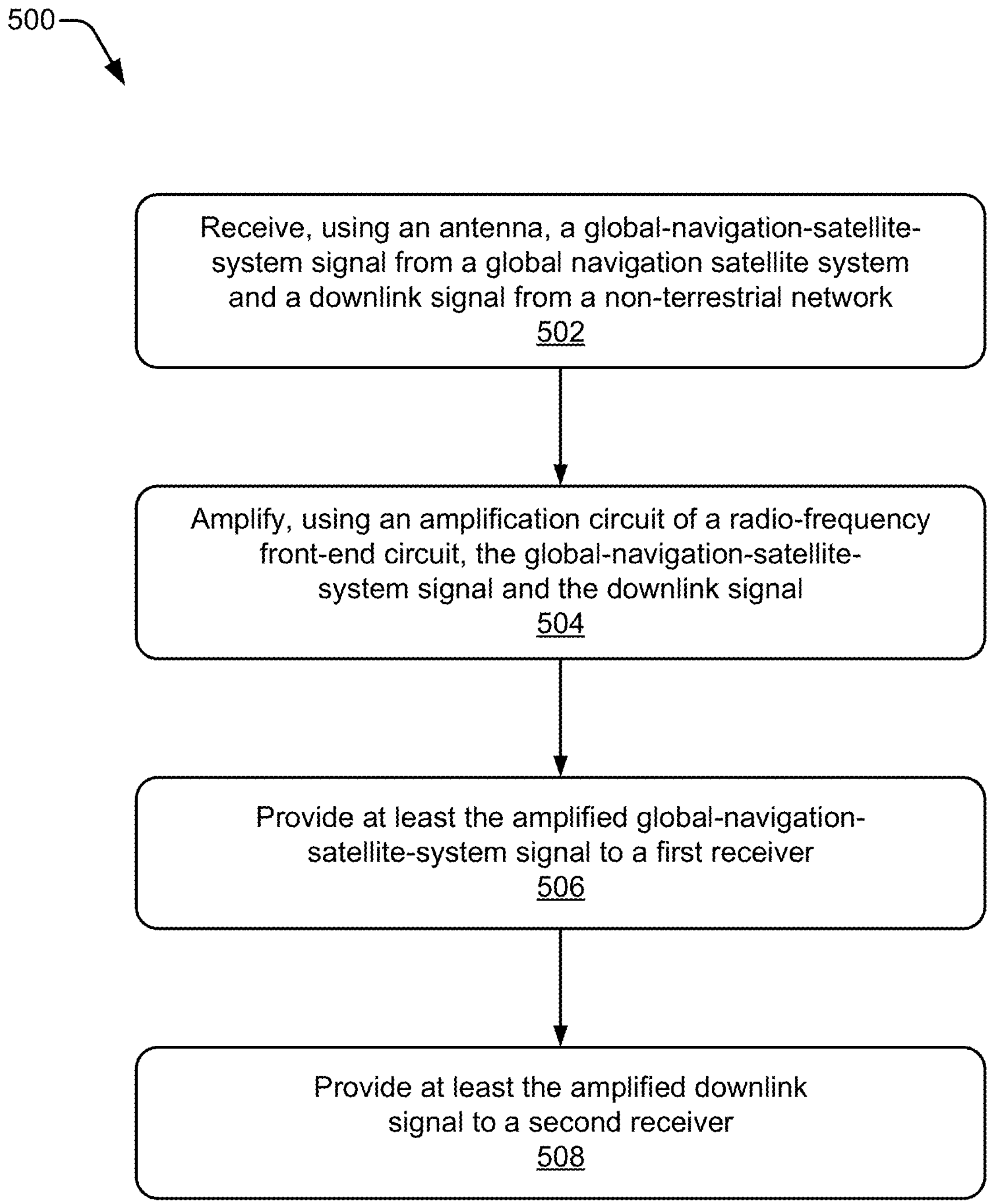
FIG. 5 illustrates an example method for operating a radio-frequency front-end circuit for location services and wireless communication.

FIG. 5 depicts an example method 500 for operating a radio-frequency front-end circuit for location services and wireless communication. Method 500 is shown as a set of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100 of FIG. 1, and entities detailed in FIG. 3, reference to which is made for example only. The techniques are not limited to performance by one entity or multiple entities operating on one device.

At 502, a global-navigation-satellite-system signal from a global navigation satellite system and a downlink signal from a non-terrestrial network are received using an antenna. For example, the antenna 124 receives the global-navigation-satellite-system signal 108 from the global navigation satellite system 106. The antenna 124 also receives the downlink signal 318 from the non-terrestrial network 112. In various situations, the antenna 124 can receive, at least portions of, the global-navigation-satellite-system signal 108 and the downlink signal 318 concurrently (e.g., at a same time) and/or during different time intervals. For situations in which the global-navigation-satellite-system signal 108 and the downlink signal 318 are received concurrently, this composite signal can be represented by the receive signal 316. Concurrent reception of the global-navigation-satellite-system signal 108 and the downlink signal 318 means that at least a portion of the global-navigation-satellite-system signal 108 and at least a portion of the downlink signal 318 overlap in time (e.g., at least a portion of these two signals are received at the same time). The antenna 124 passes the global-navigation-satellite-system signal 108 and/or the downlink signal 318 to the radio-frequency front-end circuit 134.

At 504, the global-navigation-satellite-system signal and the downlink signal are amplified using an amplification circuit of a radio-frequency front-end circuit. For example, the amplification circuit 306 of the radio-frequency front-end circuit 134 amplifies the global-navigation-satellite-system signal 108 and the downlink signal 318. The amplification of the global-navigation-satellite-system signal 108 and the downlink signal 318 can at least compensate for an insertion loss of the power divider 308.

At 506, at least the amplified global-navigation-satellite-system signal is provided to a first receiver. For example, the radio-frequency front-end circuit 134 provides at least the amplified global-navigation-satellite-system signal to the global-navigation-satellite-system receiver 126. In some situations, the radio-frequency front-end circuit 134 also provides the amplified downlink signal 318 to the global-navigation-satellite-system receiver 126 if the global-navigation-satellite-system signal 108 and the downlink signal 318 are received during a same time period.

At 508, at least the amplified downlink signal is provided to a second receiver. For example, the radio-frequency front-end circuit 134 provides at least the amplified downlink signal 318 to the receiver 132 of the non-terrestrial-network transceiver 128. In some situations, the radio-frequency front-end circuit 134 also provides the global-navigation-satellite-system signal 108 to the receiver 132 if the global-navigation-satellite-system signal 108 and the downlink signal 318 are received during a same time period. The radio-frequency front-end circuit 134 can perform the steps described at 506 and 508 using the power divider 308.

Although not explicitly shown in FIG. 5, the method 500 can also include accepting, from a transmitter, an uplink signal. For example, the radio-frequency front-end circuit 134 can accept the uplink signal 314 from the transmitter 130, as shown in FIG. 3. The method 500 can additionally include passing the uplink signal to the antenna for transmission to the non-terrestrial network. For example, the radio-frequency front-end circuit 134 can pass the uplink signal 314 to the antenna 124 for transmission to the non-terrestrial network 112, as shown in FIG. 3. To enable passing of the uplink signal 314 from the transmitter 130 to the antenna 124, the switching circuit 302 of the radio-frequency front-end circuit 134 can be placed in a first state, which couples the transmitter 130 to the antenna 124, as described with respect to FIG. 4.

CONCLUSION

Although techniques using, and apparatuses including, a radio-frequency front-end circuit for location services and wireless communication have been described in language specific to features and/or methods, it is to be understood that the subject of the appended claims is not necessarily limited to the specific features or methods described. Rather, the specific features and methods are disclosed as example implementations of a radio-frequency front-end circuit for location services and wireless communication.

What is claimed is:

1. An apparatus comprising:
a radio-frequency front-end circuit configured to:
couple to an antenna, a first receiver, and a second receiver;
accept, from the antenna, a global-navigation-satellite-system signal transmitted by a global navigation satellite system;
accept, from the antenna, a downlink signal transmitted by a non-terrestrial network;
amplify both the global-navigation-satellite-system signal and the non-terrestrial downlink signal using an amplifier of the radio-frequency front-end circuit;
pass at least the amplified global-navigation-satellite-system signal from the amplifier to the first receiver; and
pass at least the amplified downlink signal from the amplifier to the second receiver.

2. The apparatus of claim 1, wherein the radio-frequency front-end circuit is configured to:
accept, from the antenna, a receive signal comprising the global-navigation-satellite-system signal and the downlink signal, the global-navigation-satellite-system signal and the downlink signal overlap in time during at least a portion of the receive signal;
amplify the receive signal using the amplifier of the radio-frequency front-end circuit; and
pass the amplified receive signal from the amplifier to the first receiver and to the second receiver.

3. The apparatus of claim 1, wherein the radio-frequency front-end circuit is configured to:
accept the global-navigation-satellite-system signal and the downlink signal at different, non-overlapping time intervals.

4. The apparatus of claim 1, wherein the radio-frequency front-end circuit comprises a power divider having:
an input coupled to an output of the amplifier;
a first output configured to be coupled to an input of the first receiver; and
a second output configured to be coupled to an input of the second receiver.

5. The apparatus of claim 4, wherein the amplifier is configured to have a gain that at least compensates for an insertion loss associated with the power divider.

6. The apparatus of claim 1, wherein the radio-frequency front-end circuit is configured to:
accept, from a transmitter, an uplink signal; and
pass the uplink signal to the antenna for transmission to the non-terrestrial network.

7. The apparatus of claim 6, wherein the radio-frequency front-end circuit comprises a switching circuit configured to selectively:
be in a first state that couples the transmitter to the antenna; or
be in a second state that couples the first receiver and the second receiver to the antenna.

8. The apparatus of claim 7, wherein the switching circuit comprises a single-pole double-throw switch having:
a pole configured to be coupled to the antenna;
a first throw configured to be coupled to the transmitter; and
a second throw configured to be coupled to the first receiver and the second receiver via the amplifier.

9. The apparatus of claim 7, wherein:
the switching circuit is configured to:
accept a control signal having at least one bit; and
selectively be in:
the first state based on the at least one bit of the control signal having a first value; and
the second state based on the at least one bit of the control signal having a second value; and
the amplification circuit is configured to:
accept the control signal; and
selectively be in:
an inactive state based on the at least one bit having the first value; and
an active state based on the at least one bit having the second value.

10. The apparatus of claim 6, wherein a frequency band of the uplink signal and a frequency band of the global-navigation-satellite-system signal are significantly similar such that the transmission of the uplink signal interferes with concurrent reception of the global-navigation-satellite-system signal.

* * * * *